(12) United States Patent
Takahashi et al.

(10) Patent No.: US 11,303,239 B2
(45) Date of Patent: Apr. 12, 2022

(54) MAGNETIC POLE INITIAL POSITION DETECTION DEVICE USING DIRECT-CURRENT EXCITATION METHOD AND MAGNETIC POLE POSITION DETECTION DEVICE

(71) Applicant: Fanuc Corporation, Yamanashi (JP)

(72) Inventors: Kenji Takahashi, Yamanashi (JP); Yuuki Morita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/591,137

(22) Filed: Oct. 2, 2019

(65) Prior Publication Data
US 2020/0119677 A1 Apr. 16, 2020

(30) Foreign Application Priority Data

Oct. 12, 2018 (JP) .............................. JP2018-193846
Mar. 22, 2019 (JP) .............................. JP2019-055633

(51) Int. Cl.
*H02P 21/36* (2016.01)
*H02P 21/22* (2016.01)

(52) U.S. Cl.
CPC .............. *H02P 21/36* (2016.02); *H02P 21/22* (2016.02); *H02P 2203/03* (2013.01)

(58) Field of Classification Search
CPC ....... H02P 21/36; H02P 2203/03; H02P 21/22
See application file for complete search history.

(56) References Cited

U.S. PATENT DOCUMENTS

| 10,161,766 B2 | 12/2018 | Liu | |
|---|---|---|---|
| 2005/0104582 A1* | 5/2005 | Toyozawa | ................. H02P 1/46 324/207.25 |
| 2014/0028230 A1* | 1/2014 | Yamaguchi | ............... H02P 6/16 318/400.38 |
| 2014/0167662 A1 | 6/2014 | Ajima et al. | |

FOREIGN PATENT DOCUMENTS

| JP | H02-276492 A | 11/1990 |
|---|---|---|
| JP | 10262397 A | 9/1998 |
| JP | 2000-078878 A | 3/2000 |
| JP | 2001103784 A | 4/2001 |

(Continued)

*Primary Examiner* — Kawing Chan
*Assistant Examiner* — Bradley R Brown
(74) *Attorney, Agent, or Firm* — RatnerPrestia

(57) ABSTRACT

A magnetic pole initial position detection device includes: a direct-current excitation command generation section configured to generate a first command for causing a constant excitation current with a current phase fixed to a first phase to flow through the synchronous motor; a torque-zero determination section configured to determine whether a torque generated in the rotor of the synchronous motor is zero when the excitation current based on the first command flows through the synchronous motor; and a magnetic pole initial position acquisition section configured to acquire the magnetic pole initial position of the rotor of the synchronous motor on a basis of a rotor actual position at or near a point in time when the torque-zero determination section determines that the torque is zero; a number of pole pairs of the synchronous motor; and an excitation phase during direct-current excitation under the first command.

7 Claims, 11 Drawing Sheets

(56) References Cited

FOREIGN PATENT DOCUMENTS

| | | | |
|---|---|---|---|
| JP | 2001-157482 | A | 6/2001 |
| JP | 2007318894 | A | 12/2007 |
| JP | 2008118778 | A | 5/2008 |
| JP | 2013027261 | A | 2/2013 |
| JP | 2015082904 | A | 4/2015 |
| WO | 2014192467 | A1 | 12/2014 |

\* cited by examiner

MAGNETIC POLE INITIAL POSITION DETECTION DEVICE USING DIRECT-CURRENT EXCITATION METHOD AND MAGNETIC POLE POSITION DETECTION DEVICE

CROSS-REFERENCE TO RELATED APPLICATIONS

This application is a new U.S. Patent Application that claims benefit of Japanese Patent Application No. 2018-193846, dated Oct. 12, 2018, and Japanese Patent Application No. 2019-055633, dated Mar. 22, 2019. The disclosures of these applications'are being incorporated herein by reference in their entirety for ail purposes.

BACKGROUND OF THE INVENTION

1. Field of the Invention

The present invention relates to a magnetic pole initial position detection device using a direct-current excitation method and a magnetic pole position detection device.

2. Description of the Related Art

In a synchronous motor, a current is applied to an appropriate excitation phase winding in accordance with a magnetic pole position of a rotor by using a dq-coordinate control system to generate a desired torque. Synchronous motors are categorized into synchronous motors provided with a magnetic pole position sensor such as an encoder for detecting the magnetic pole position of the rotor and synchronous motors provided with no magnetic pole position sensor.

In a synchronous motor provided with no magnetic pole position sensor, a magnetic pole position detection process is performed at each powering-on (activation) of the synchronous motor to detect the initial position of the magnetic pole (hereinafter referred to as a "magnetic pole initial position"), and the rotation of the synchronous motor is controlled on the basis of the magnetic pole position relative to the detected magnetic pole initial position. A method for detecting the magnetic pole initial position is, for example, a direct-current excitation method in which a constant excitation current with a fixed current phase is continuously applied to the synchronous motor and the final stopped position is set as a magnetic pole initial position.

For example, a known driving circuit of a brushless motor (e.g., see JP 2-276492 A) includes: an energizing unit configured to apply an excitation current to a drive coil to generate a rotating magnetic field in a stator; a rotor including a permanent magnet rotated by the rotating magnetic field; an encoder configured to output phase-shifted two-phase pulsed rotation signals in response to the rotation of the rotor; a rotational speed detection unit configured to detect a rotational angular speed of the rotor from the number of pulses of the rotation signal in a unit time and to detect a rotational direction of the rotor from the rotation signal; a logical operation unit configured to perform control of stopping the energization after the energization of the drive coil has been performed for a certain period and to calculate an initial position of the rotor from an output of the rotation speed detection unit; and a counter configured to count, using the inputted rotation signal, a rotation amount of the rotor from an initial position up to the current time, wherein the logical operation unit determines a current position of the rotor from the initial position of the rotor and the rotation amount up to the current time.

For example, in a known control device (e.g., see JP 2000-78878 A) for a permanent magnet type synchronous motor that is controlled by a variable voltage and a variable frequency output from a power converter, and for a mechanical device driven by the permanent magnet type synchronous motor, the control device is configured to release a brake device that brings the mechanical device to a halt and to estimate the magnetic pole phase of the permanent magnet type synchronous motor from the armature current and the load torque or from the armature current in the case where the motor generated torque and the load torque caused when a predetermined armature current is applied thereto are approximately balanced, regardless of the rotational position of the permanent magnet synchronous motor.

For example, in a known initial magnetic pole estimation device of an AC synchronous motor (e.g., see JP 2001-157482 A) provided in an AC synchronous motor control device including a speed control unit configured to calculate a command torque (command current) from a command speed, and a current control unit and a PWM power conversion device configured to drive the AC synchronous motor in accordance with the command torque (command current), the initial magnetic pole estimation device includes: a speed deviation calculation unit configured to calculate a speed deviation by subtracting the detection speed from the command speed generated by a command speed pattern generating unit; a speed gain control unit configured to calculate a command torque (command current) by multiplying the speed deviation by a speed gain; a mode period determination unit configured to perform a process of determining a mode period (a first cycle period and a second cycle period) from the command speed; a mode switch configured to switch a mode period between the first cycle period and the second cycle period in accordance with a result in the mode period determination unit; a data acquisition speed period determination unit configured to determine whether the command speed is in a data acquisition speed period in a case where the first cycle period is selected; a first command torque calculation unit (first command current calculation unit) configured to calculate first command torque data (first command current data) from the command torque (the command current) in the determined data acquisition speed period; a data acquisition speed period determination unit configured to determine whether the command speed is in the data acquisition speed period in a case where the second cycle period is selected; a second command torque calculation unit (second command current calculation unit) configured to calculate second command torque data (second command current data) from the command torque (the command current) in the determined data acquisition speed period; and an estimated initial magnetic pole computation unit configured to compute an estimated magnetic pole initial position by using information on the first command torque data (the first command current data) and the second command torque data (the second command current data).

SUMMARY OF THE INVENTION

In a magnetic pole initial position detection process using a direct-current excitation method, for example, direct-current excitation is performed on a synchronous motor at a magnetic pole of 0 degrees, and after a rotor of the synchronous motor is stopped, direct-current excitation is performed at a magnetic pole of 90 degrees. Then, after the rotor is stopped, the stopped position is acquired as the magnetic pole initial position. The time from the start of the direct-current excitation of the synchronous motor until stop of the rotor of the synchronous motor in this method is very long, and consequently acquisition of the magnetic pole initial position takes a long time. In particular, for a synchronous motor having a high acceleration performance with very little friction, such as a synchronous motor having a hydrostatic bearing, acquisition of the magnetic pole initial position may require several minutes. As such, in a magnetic pole position detection process using a direct-current excitation method, a technique capable of acquiring a magnetic pole initial position of a rotor of a synchronous motor in a short period of time is desired.

According to one aspect of the present disclosure, a magnetic pole initial position detection device is configured to detect a magnetic pole initial position of a rotor of a synchronous motor, the magnetic pole initial position detection device including: a direct-current excitation command generation section configured to generate a first command for causing a constant excitation current with a current phase fixed to a first phase to flow through the synchronous motor; a torque-zero determination section configured to determine whether a torque generated in the rotor of the synchronous motor is zero when the excitation current based on the first command flows through the synchronous motor; and a magnetic pole initial position acquisition section configured to acquire the magnetic pole initial position of the rotor of the synchronous motor on a basis of a rotor actual position at or near a point in time when the torque-zero determination section determines that the torque is zero; a number of pole pairs of the synchronous motor; and an excitation phase during direct-current excitation under the first command.

According to another aspect of the present disclosure, a magnetic pole position detection device includes a magnetic pole position update section configured to output a magnetic pole position of the rotor of the synchronous motor that is initialized at the magnetic pole initial position detected by the magnetic pole initial position detection device.

BRIEF DESCRIPTION OF THE DRAWINGS

The objects, features and advantages of the invention will become more apparent from the following description of the embodiments in connection with the accompanying drawings, and in the accompanying drawings.

FIG. 2A is a diagram illustrating a speed and position of the rotor on a time-series basis, and FIG. 2B is a diagram represented by enlarging FIG. 2A in a time axis direction;

DETAILED DESCRIPTION

Figure 1:
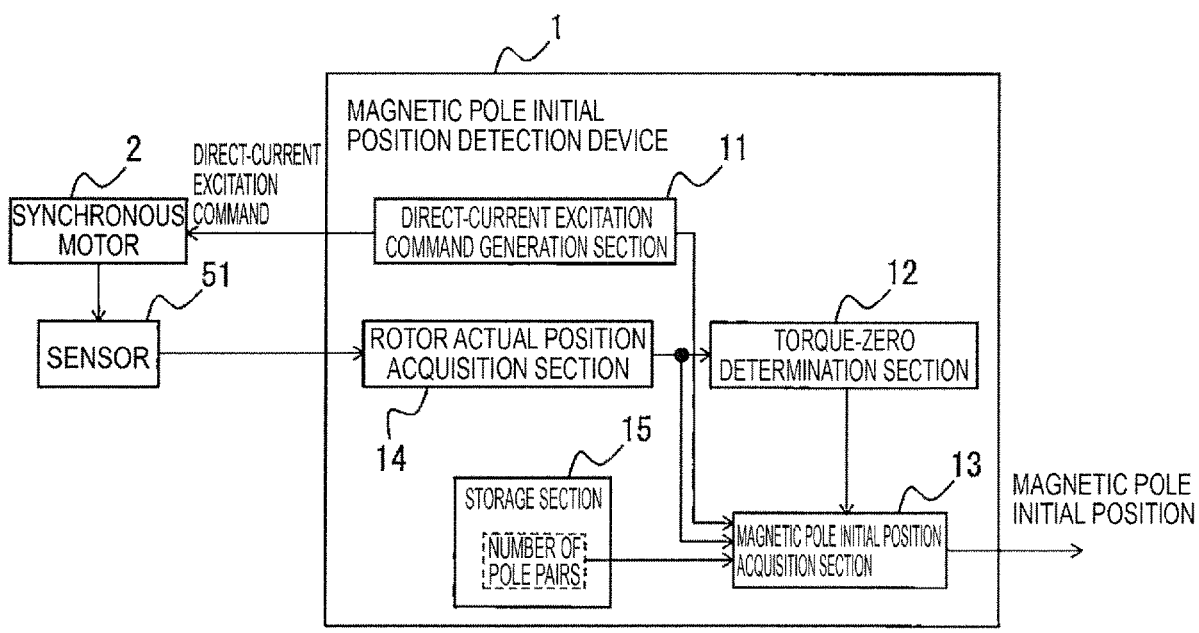
FIG. 1 is a block diagram illustrating a magnetic pole initial position detection device according to a first embodiment of the present disclosure.

A magnetic pole initial position detection device using a direct-current excitation method and a magnetic pole position detection device according to an embodiment of the present disclosure are described below with reference to the accompanying drawings. Throughout the drawings, corresponding components are denoted by common reference numerals. The drawings are scaled appropriately to facilitate understanding. Embodiments illustrated in the drawings are an example for implementation, and the disclosure is not limited to the embodiments illustrated.

First Embodiment

FIG. 1 is a block diagram illustrating a magnetic pole initial position detection device according to a first embodiment of the present disclosure.

As illustrated in FIG. 1, a magnetic pole initial position detection device 1 that detects a magnetic pole initial position of a rotor of a synchronous motor 2 according to the present embodiment includes a direct-current excitation command generation section 11, a torque-zero determination section 12, a magnetic pole initial position acquisition section 13, a rotor actual position acquisition section 14, and a storage section 15.

The direct-current excitation command generation section 11 generates a command (hereinafter also referred to as a first command) for causing a constant excitation current with a current phase fixed to a predetermined phase (hereinafter also referred to as a first phase) to flow through the synchronous motor 2. The command generated by the direct-current excitation command generation section 11 is sent to a current control section 33 in a motor control device 1000 for controlling the driving of the synchronous motor 2 (see FIG. 8). The current control section 33 in the motor control device 1000 generates a voltage command on the basis of the command received from the direct-current excitation command generation section 11 and the current feedback converted in the fixed current phase, and a power conversion section 35 generates a constant excitation current with a fixed current phase by applying a voltage to the synchronous motor 2 on the basis of the received voltage command. With this excitation current as a drive source, the rotor of the synchronous motor 2 oscillates in the rotational direction, and the oscillation gradually attenuates and finally stops.

The torque-zero determination section 12 determines whether the torque generated in the rotor of the synchronous motor 2 is zero (0) when the constant excitation current based on the first command generated by the direct-current excitation command generation section 11 is flowing through the synchronous motor 2. Note that, in the rotor oscillating in the rotational direction, a point in time (timing) when the torque is zero occurs a plurality of times until the rotor is completely stopped, and accordingly the torque-zero determination section 12 has a plurality of opportunities for torque-zero determination before the rotor is completely stopped. Regarding the plurality of torque-zero determination opportunities, as the torque-zero determination opportunity gets closer to the start timing of the direct-current excitation command input to the synchronous motor 2 by the direct-current excitation command generation section 11, the time that is required for completing a process of acquiring the magnetic pole initial position of the rotor of the synchronous motor 2 by the magnetic pole initial position acquisition section 13 from the start timing of the direct-current excitation command input to the synchronous motor 2 by the direct-current excitation command generation section 11 is shortened. For example, most preferably, the torque-zero determination section 12 detects the first torque-zero caused after the direct-current excitation command to the synchronous motor 2 is started by the direct-current excitation command generation section 11 and notifies the detection result (i.e., the torque-zero determination) to the magnetic pole initial position acquisition section 13.

The magnetic pole initial position acquisition section 13 acquires the magnetic pole initial position of the rotor of the synchronous motor 2 on the basis of the position (rotor actual position) of the rotor of the synchronous motor 2 at or near a point in time when the torque-zero determination section 12 determines that the torque is zero; the number of pole pairs of the synchronous motor 2; and the excitation phase during the direct-current excitation.

The rotor actual position acquisition section 14 acquires the rotor actual position, which is the position of the rotor of the synchronous motor 2, from a sensor 51 provided in the synchronous motor 2.

The storage section 15 stores information relating to the number of pole pairs of the synchronous motor 2. The storage section 15 is formed of a non-volatile memory, such as EEPROM™, which is electrically erasable and recordable, or a random-access memory, such as DRAM and SRAM, which is readable and writable at high speed, for example.

Figure 2A:
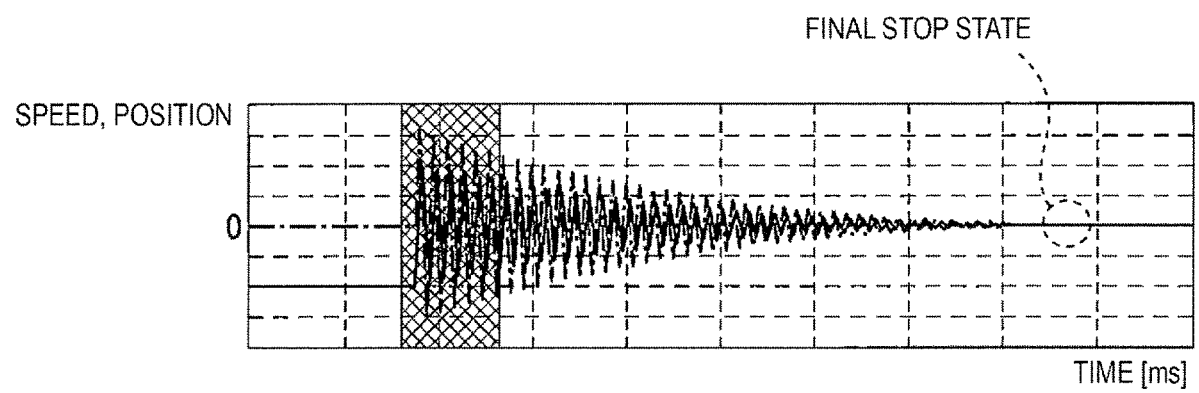
FIGS. 2A and 2B illustrate an exemplary behavior of a rotor of a synchronous motor in the case where a constant excitation current with a fixed current phase continuously flows through the synchronous motor.
Figure 2B:
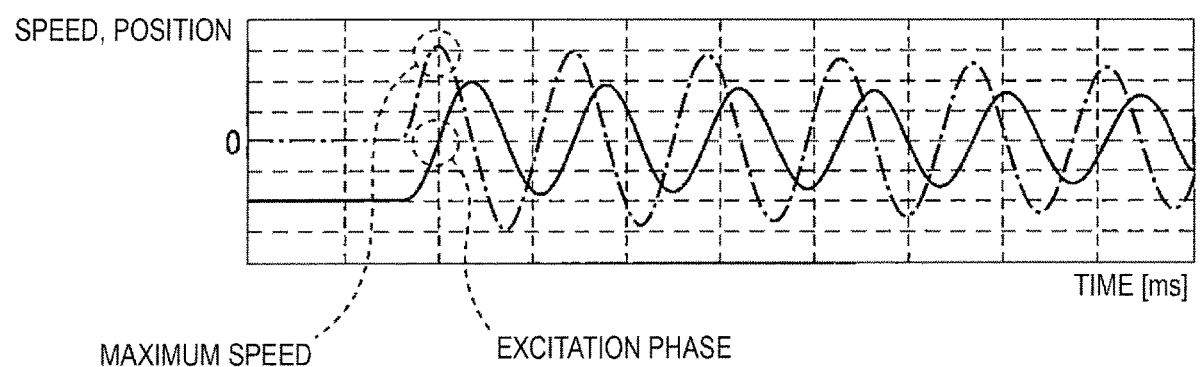
Figure 3:
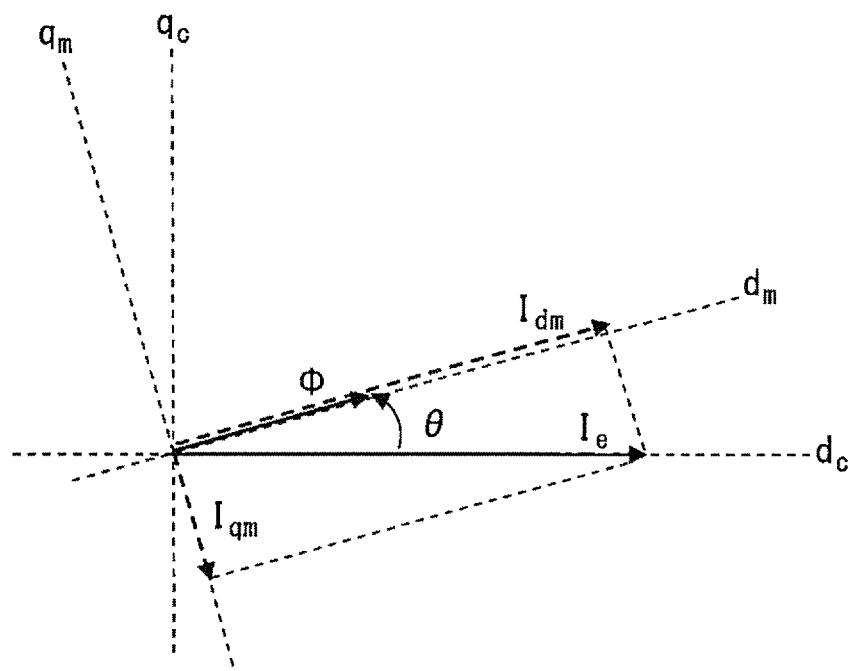
FIG. 3 is a diagram illustrating a relationship between a dq-coordinate system according to the synchronous motor and a dq-coordinate system according to a motor control device that controls the synchronous motor.

Now, with reference to FIGS. 2A to 3, the following describes a principle of acquisition of the magnetic pole initial position of the rotor of the synchronous motor 2 on the basis of the rotor actual position at or near a point in time when the torque generated at the rotor of the synchronous motor 2 is zero.

FIGS. 2A and 2B illustrate an exemplary behavior of a rotor of a synchronous motor in the case where a constant excitation current with a fixed current phase continuously flows through the synchronous motor. FIG. 2A is a diagram illustrating the speed and position of the rotor on a time-series basis, and FIG. 2B is a diagram represented by enlarging FIG. 2A in the time axis direction. In FIGS. 2A and 2B, the solid line indicates the rotor actual position of the synchronous motor 2 on a time-series basis, and the dot-dash line indicates the speed (rotational angular speed) of the synchronous motor 2. When a constant excitation current with a fixed current phase continuously flows through the synchronous motor 2, the rotor of the synchronous motor 2 oscillates in the rotational direction as illustrated in FIGS. 2A and 2B. The oscillation of the synchronous motor 2 gradually attenuates and the rotor finally stops.

FIG. 3 is a diagram illustrating a relationship between a dq-coordinate system according to the synchronous motor and a dq-coordinate system according to a motor control device that controls the synchronous motor. The coordinate axes of the dq-coordinate system according to the synchronous motor are denoted by $d_m$ and $q_m$, and the coordinate axes of the dq-coordinate system according to the motor control device that controls the synchronous motor are denoted by $d_c$ and $q_c$. The deviation amount of the d-axis between the coordinate systems (i.e., the angle between the coordinate axis $d_m$ and the coordinate axis $d_c$) is denoted by $\theta$. Note that the deviation amount $\theta$ is also the deviation amount of the q-axis between the coordinate systems (i.e., the angle between the coordinate axis $q_m$ and the coordinate axis $q_c$).

A constant excitation current with a current phase fixed at 0 degrees in the dq-coordinate system according to the motor control device is denoted by $I_e$. In this case, in the dq-coordinate system according to the synchronous motor, the excitation current $I_e$ is expressed as Equation (1).

$$I_{dm} = I_e \cdot \cos\theta$$

$$I_{qm} = -I_e \cdot \sin\theta \tag{1}$$

When the number of pole pairs of the synchronous motor 2 is denoted by pp, the main magnetic flux is denoted by $\Phi$, the d-phase inductance is denoted by $L_d$, and the q-phase inductance is denoted by $L_q$, the torque $T_r$ generated when the excitation current $I_e$ flows through the salient-pole synchronous motor is expressed as Equation (2).

$$\begin{aligned} T_r &= pp \cdot \{\Phi - (L_q - L_d) \cdot I_{dm}\} \cdot I_{qm} \\ &= pp \cdot \{\Phi - (L_q - L_d) \cdot I_e \cdot \cos\theta\} \cdot (-I_e \cdot \sin\theta) \end{aligned} \tag{2}$$

The d-phase inductance $L_d$ and the q-phase inductance $L_q$ are equal to each other in non-salient-pole synchronous motors (i.e., synchronous motors that do not have a salient pole). Accordingly, the torque $T_r$ that is generated when the excitation current $I_e$ flows through a non-salient-pole synchronous motor is expressed as Equation (3), which is obtained by transforming Equation (2).

$$T_r = pp \cdot \Phi \cdot (-I_e \cdot \sin\theta) \tag{3}$$

When a constant excitation current with a fixed current phase continuously flows through the synchronous motor, the rotor of the synchronous motor oscillates in the rotational direction, and the oscillation gradually attenuates and finally stops as illustrated in FIGS. 2A and 2B. When the rotor of the synchronous motor is located at a final stop position, the stop position of the rotor matches the excitation phase, and the deviation amount $\theta$ between the coordinate systems is zero. While the rotor oscillates in the rotational direction with the excitation current continuously flowing through the synchronous motor, the deviation amount $\theta$ changes with time. Equations (2) and (3) include "sin $\theta$", and when the deviation amount $\theta$ is zero, "sin $\theta$" is zero, and accordingly the torque $T_r$ is zero. Conversely, when the torque $T_r$ is zero, "sin θ" in Equations (2) and (3) can be zero, i.e., the deviation amount θ can be zero. Therefore, by detecting a point in time when the torque $T_r$ is zero when a constant excitation current with a fixed current phase continuously flows through the synchronous motor, the magnetic pole initial position is acquired on the basis of the rotor actual position at that point in time.

However, in the case of a salient-pole synchronous motor, "$\{\Phi-(L_q-L_d)\cdot I_e \cdot \cos θ\}$" in Equation (2) can be zero, i.e., the torque $T_r$ expressed in Equation (2) can be zero when θ has a value other than zero depending on the magnitude of the excitation current $I_e$. In other words, in the case of a salient-pole synchronous motor, the deviation amount θ is not necessarily zero even when the torque $T_r$ is zero. Accordingly, in the case where the present embodiment is applied to a salient-pole synchronous motor, it is necessary not to allow the excitation current $I_e$ that sets "$\{\Phi-(L_q-L_d)\cdot I_e \cdot \cos θ\}$" to zero to flow. On the other hand, in the case of a non-salient-pole synchronous motor, the deviation amount θ is expressed as Equation (3), and accordingly the torque $T_r$ is zero only when the deviation amount θ is zero. Therefore, in the case where the present embodiment is applied to a non-salient-pole synchronous motor, it is not necessary to provide an upper limit value to the constant excitation current $I_e$ with a fixed current phase.

Now, the magnitude of the excitation current $I_e$ to be applied for acquiring the magnetic pole initial position of a salient-pole synchronous motor is described with reference to FIGS. 4A, 4B, and 5.

Figure 4A:
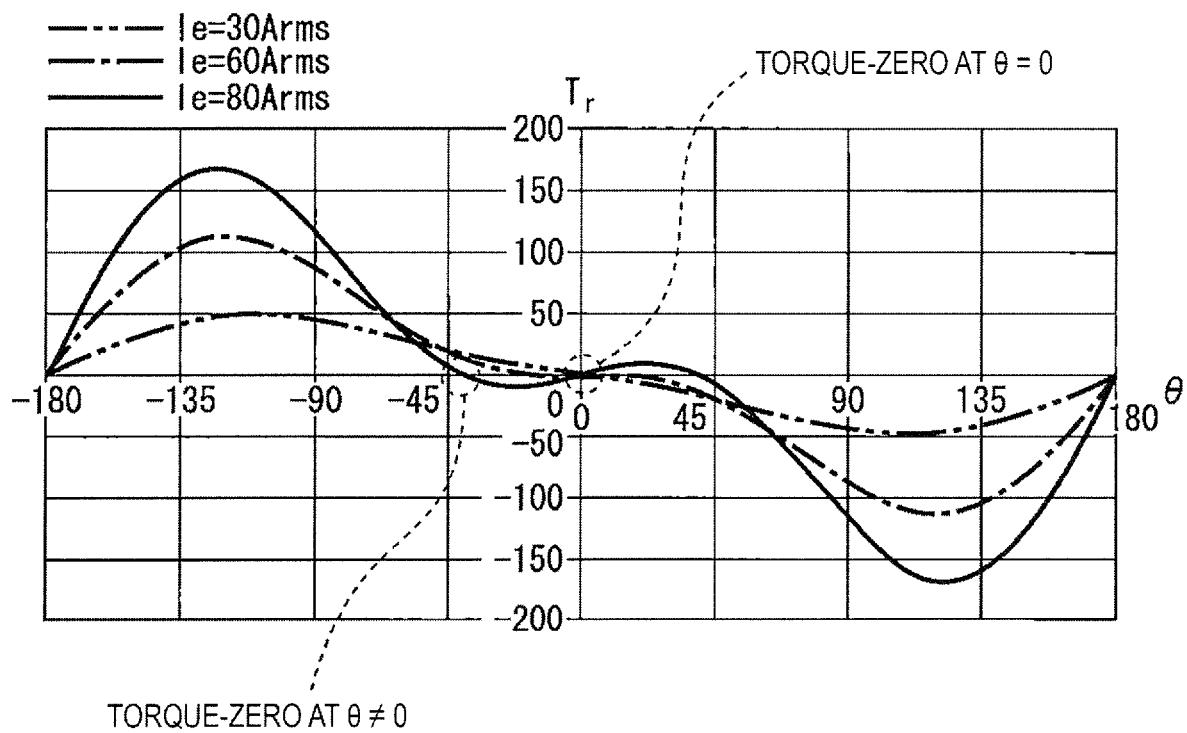
FIGS. 4A and 4B are diagrams illustrating magnitudes of an excitation current applied to obtain a magnetic pole initial position of a salient-pole synchronous motor.
Figure 4B:
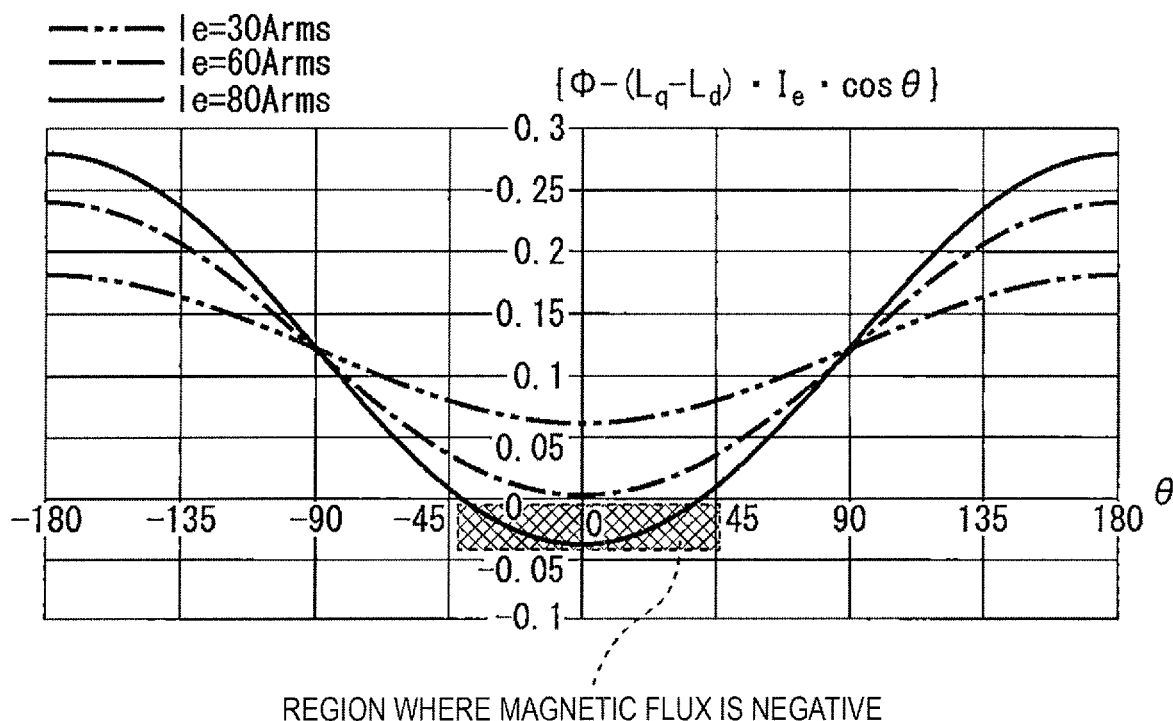

FIGS. 4A and 4B are diagrams illustrating magnitudes of an excitation current that is applied for acquiring the magnetic pole initial position of a salient-pole synchronous motor. In FIG. 4A, the horizontal axis indicates the deviation amount θ, and the vertical axis indicates the torque $T_r$. In FIG. 4B, the horizontal axis indicates the deviation amount θ, and the vertical axis indicates the value obtained by dividing the equation of the generated torque by the q-phase current. In FIGS. 4A and 4B, the chain double-dashed line indicates a case where the excitation current $I_e$ is 30 Arms, the dot-dash line indicates a case where the excitation current $I_e$ is 60 Arms, and the solid line indicates a case where the excitation current $I_e$ is 80 Arms. Note that the magnitude of the excitation current $I_e$ illustrated in FIGS. 4A and 4B is merely an example.

When the excitation current $I_e$ is 30 Arms or 60 Arms, the torque $T_r$ is zero only when the deviation amount θ is zero as illustrated in FIG. 4A. In contrast, when the excitation current $I_e$ is 80 Arms, the torque $T_r$ is zero not only when the deviation amount θ is zero, but also when the deviation amount θ is at or near "−44 degrees". The reason for the occurrence of such a situation where the torque $T_r$ is zero also when the deviation amount θ has a value other than zero with the excitation current $I_e$ of 80 Arms is that the value obtained by dividing the equation of the generated torque by the q-phase current has a negative region as illustrated in FIG. 4B. Accordingly, in the case where the present embodiment is applied to a salient-pole synchronous motor, it is necessary to set the excitation current $I_e$ so that the torque $T_r$ expressed in Equation (2) is positive (i.e., a value greater than zero) in all cases where the deviation amount θ is not zero. The details are as follows.

Inequality (4) is acquired by applying "$T_r > 0$" and "$θ \neq 0$" to Equation (2) and by transforming Equation (2).

$$\Phi-(L_q-L_d)\cdot I_e \cdot \cos θ > 0 \qquad (4)$$

In Inequality (4), "$-1 \leq \cos θ \leq 1$" holds, and accordingly Inequality (5) is acquired from Inequality (4).

$$\Phi-(L_q-L_d)\cdot I_e > 0 \qquad (5)$$

Inequality (6) is acquired by transforming the Inequality (5).

$$I_e < \frac{\Phi}{L_q - L_d} \qquad (6)$$

Accordingly, in the case where the present embodiment is applied to a salient-pole synchronous motor, the constant excitation current $I_e$ with a fixed current phase should be set to a magnitude that satisfies Inequality (6). In the present embodiment, when the synchronous motor, of which the magnetic pole initial position is to be acquired, is a salient-pole synchronous motor, the direct-current excitation command generation section 11 generates a command to cause the excitation current $I_e$ lower than an upper limit value "$\Phi/(L_q-L_d)$" to flow through the synchronous motor 2.

Note that the main magnetic flux Φ decreases as the temperature of the permanent magnet provided in the synchronous motor 2 increases. Accordingly, the upper limit value of the excitation current $I_e$ may be set in consideration of the temperature rise that may occur in the permanent magnet at the time of driving the synchronous motor 2 having a salient pole. Now, the magnitude of the excitation current $I_e$ to be applied for acquiring the magnetic pole initial position in consideration of the temperature rise in the permanent magnet of the salient-pole synchronous motor is described with reference to FIG. 5.

Figure 5:
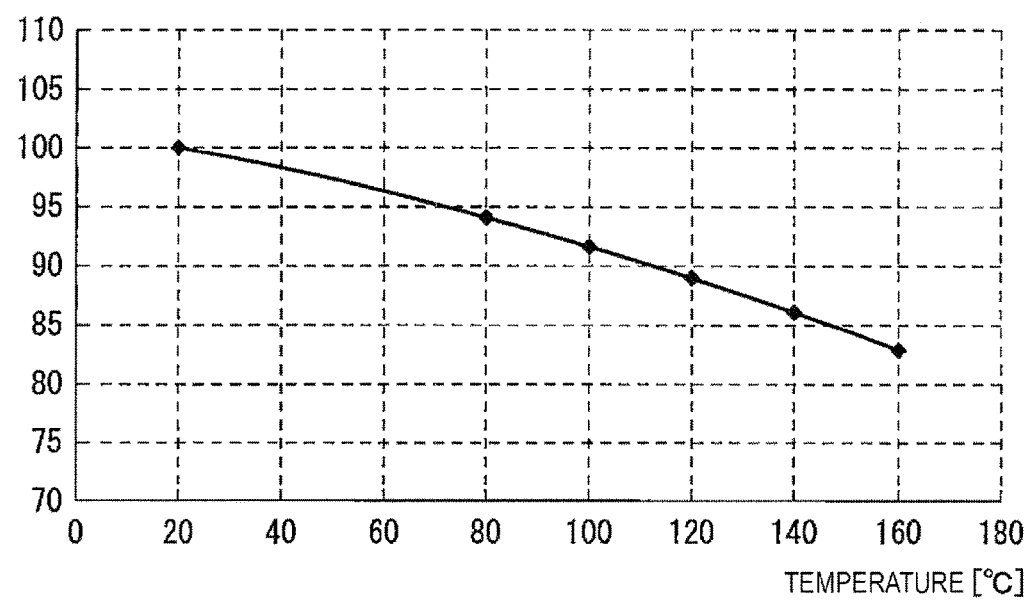
FIG. 5 is a diagram illustrating an exemplary relationship between a temperature of a permanent magnet provided in the synchronous motor and a magnetic flux density of a main magnetic flux of the synchronous motor.

FIG. 5 illustrates a relationship between a temperature of a permanent magnet provided in a synchronous motor and a magnetic flux density of a main magnetic flux of the synchronous motor. In FIG. 5, the horizontal axis indicates the temperature of the permanent magnet provided in the synchronous motor 2, and the vertical axis indicates the ratio of the magnetic flux density with respect to the case where the magnetic flux density of a permanent magnet at 20° C. is defined as 100%. Note that the numerical values illustrated in FIG. 5 are merely examples and may be set to other numerical values. For example, in the case where an anticipated maximum temperature of the permanent magnet at the time of driving the synchronous motor 2 having a salient pole is 160 degrees, the excitation current $I_e$ is limited in consideration of a magnetic flux $\Phi_{min}$ (the smallest magnetic flux density) at the anticipated maximum temperature of the permanent magnet of the synchronous motor 2 so that the generated torque is not zero at the deviation amount θ other than zero even when the permanent magnet is at 160 degrees. That is, Inequality (7) can be obtained from Inequality (6).

$$I_e < \frac{\Phi_{min}}{L_q - L_d} \qquad (7)$$

Thus, in the case where the present embodiment is applied to a salient-pole synchronous motor, the constant excitation current I, with a fixed current phase may be set to a magnitude that satisfies Inequality (7) in consideration of the temperature rise in the permanent magnet that is anticipated at the time of driving the synchronous motor. In this case, the direct-current excitation command generation section 11 generates a command to cause the excitation current $I_e$ lower than an upper limit value "$\Phi_{min}/(L_q-L_d)$" to flow through the synchronous motor 2.

Now, a torque-zero determination process performed by the torque-zero determination section 12 is described with reference to FIGS. 2A and 2B.

As illustrated in FIGS. 2A and 2B, when a constant excitation current with a fixed current phase continuously flows through the synchronous motor 2, the rotor of the synchronous motor 2 oscillates in the rotational direction. The oscillation of the synchronous motor 2 gradually attenuates, and the rotor finally stops. During the oscillation of the rotor of the synchronous motor 2 in the rotational direction, the torque $T_r$ generated in the rotor of the synchronous motor 2 is zero at the point in time when the polarity of the acceleration of the rotor of the synchronous motor 2 changes from positive to negative or from negative to positive. In addition, the speed of the synchronous motor 2 is highest (maximized) at the point in time when the polarity of the acceleration of the synchronous motor 2 changes from positive to negative, and the speed of the synchronous motor 2 is lowest (minimized) at the point in time when the polarity of the acceleration of the synchronous motor 2 changes from negative to positive. Accordingly, in the present embodiment, the torque-zero determination section 12 acquires the acceleration (of the rotor) of the synchronous motor 2 and determines that the point in time when the polarity of the acceleration of the synchronous motor 2 changes is the point in time when the torque is zero. Alternatively, the torque-zero determination section 12 acquires the speed (of the rotor) of the synchronous motor 2 and determines that the point in time when the speed of the synchronous motor 2 is maximized or minimized is the point in time when the torque is zero. The acceleration of the synchronous motor 2 can be acquired through second order differentiation of the rotor actual position acquired by the rotor actual position acquisition section 14. The speed of the synchronous motor 2 can be acquired through first order differentiation of the rotor actual position acquired by the rotor actual position acquisition section 14. The differential calculation process of the rotor actual position may be performed in the torque-zero determination section 12, the rotor actual position acquisition section 14, or other processing sections.

Next, a magnetic pole initial position acquisition process performed by the magnetic pole initial position acquisition section 13 is described with reference to FIG. 6.

Figure 6:
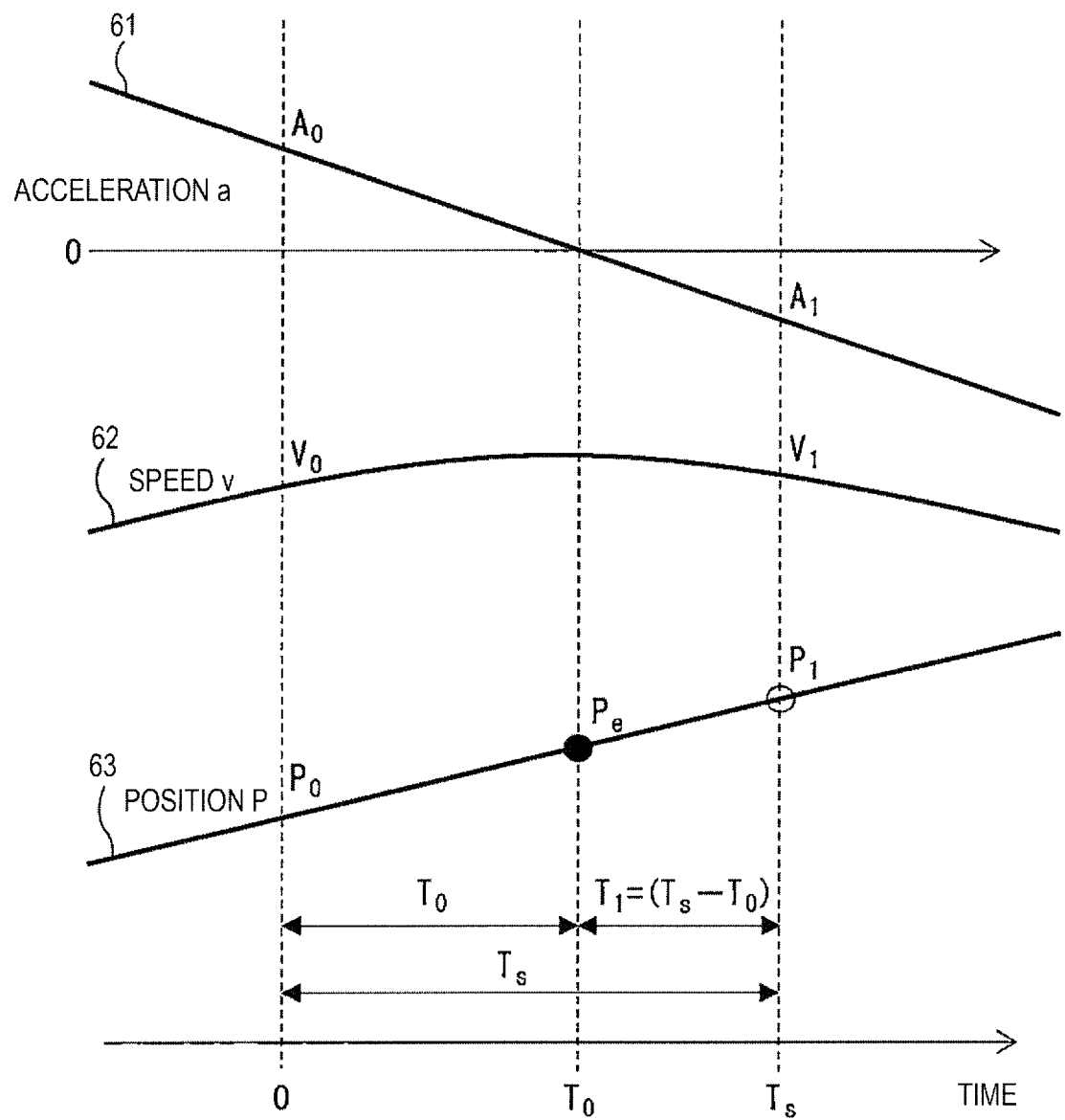
FIG. 6 is a diagram illustrating a magnetic pole initial position acquisition process according to the first embodiment of the present disclosure, with examples of the acceleration of the rotor of the synchronous motor, the speed of the rotor of the synchronous motor, and the rotor actual position of the synchronous motor.

FIG. 6 is a diagram illustrating a magnetic pole initial position acquisition process according to the embodiment of the present disclosure. In FIG. 6, an example of the acceleration of the rotor of the synchronous motor is denoted by a reference numeral 61, an example of the rotor speed of the synchronous motor is denoted by a reference numeral 62, and an example of the rotor actual position of the synchronous motor is denoted by a reference numeral 63.

The magnetic pole initial position acquisition section 13 acquires the magnetic pole initial position of the rotor of the synchronous motor 2 on the basis of the rotor actual position at or near the point in time when the torque-zero determination section 12 determines that the torque $T_r$ is zero; the number of pole pairs of the synchronous motor 2; and the excitation phase during the direct-current excitation. In the illustrated example, when the sampling cycle of the rotor actual position acquired by the rotor actual position acquisition section 14 is denoted by $T_s$, the rotor actual position acquisition section 14 acquires the rotor actual position at time 0 and then acquires the rotor actual position at time $T_s$. Assume that, at time $T_0$ between time 0 and time $T_s$, the polarity of the acceleration a of the rotor of the synchronous motor 2 changes from positive to negative (in other words, the acceleration a of the rotor is zero-crossed). The acceleration of the rotor of the synchronous motor 2 at time 0 is denoted by $A_0$, the rotor speed by $V_0$, and the rotor actual position by $P_0$. The acceleration of the rotor of the synchronous motor 2 at time $T_s$ is denoted by $A_1$, the speed of the rotor by $V_1$, and the rotor actual position by $P_1$. The rotor actual position at time $T_0$ is denoted by $P_e$. In the illustrated example, a value, obtained by adding the excitation phase during the direct-current excitation to a value obtained by multiplying, by the number of pole pairs of the synchronous motor 2, the deviation between the rotor actual position $P_e$ at time $T_0$ when the torque $T_r$ is zero and the rotor actual position $P_1$ at time $T_s$, corresponds to the magnetic pole initial position of the rotor of the synchronous motor 2. In other words, a point in time when it is determined that the torque $T_r$ is zero is included within a time period between time 0 and time $T_s$, which are two sampling points in time that define a sampling period including a point in time when the torque-zero determination section 12 determines that the torque $T_r$ is zero, of the sampling periods of the rotor actual position acquired by the rotor actual position acquisition section 14. In the present embodiment, of the sampling periods of the rotor actual position acquired by the rotor actual position acquisition section 14, any point in time between two sampling points in time (time 0 and time $T_s$ in the example of FIG. 6) that define a sampling period including the point in time when the torque-zero determination section 12 determines that the torque $T_r$ is zero is regarded as a "point in time when it is determined that the torque is zero", which is expressed as "at or near" the point in time when it is determined that the torque is zero. That is, the "at or near the point in time when it is determined that the torque is zero" may be any point in time as long as the point in time is included in the time period between two sampling points in time that define the sampling period including the point in time when the torque-zero determination section 12 determines that the torque $T_r$ is zero. Hereafter, the rotor actual position $P_e$ at this point in time is calculated. Example forms of the calculation process for the rotor actual position $P_e$ are described below.

In a first form of the calculation process for the rotor actual position $P_e$, the rotor actual position $P_e$ is calculated in the following method.

The acceleration a of the rotor of the synchronous motor 2 at time t is expressed as Equation (8).

$$a(t) = \frac{A_1 - A_0}{T_S} \cdot t + A_0 \qquad (8)$$

Accordingly, time $T_0$ at which the acceleration of the rotor of the synchronous motor 2 changes from positive to negative is expressed as Equation (9), which is obtained by substituting $t=T_0$ and $a(T_0)=0$ into Equation (8).

$$T_0 = \frac{A_0}{A_0 - A_1} \cdot T_S \qquad (9)$$

At this time, since the rotor actual position also substantially monotonously increases on a proportional basis, the rotor actual position $P_e$ at the point in time when the polarity of the acceleration a of the rotor of the synchronous motor 2 changes from positive to negative (i.e., the point in time when the acceleration a of the rotor is zero-crossed), which is the point in time when the torque $T_r$ is zero, is expressed as Equation (10).

$$P_e = \frac{P_1 - P_0}{T_S} \cdot T_0 + P_0 \qquad (10)$$
$$= (P_1 - P_0) \cdot \frac{A_0}{A_0 - A_1} + P_0$$

In the first form of the calculation process of the rotor actual position $P_e$, the magnetic pole initial position acquisition section 13 calculates the rotor actual position on the basis of Equation (10).

In a second form of the calculation process for the rotor actual position $P_e$, the rotor actual position $P_e$ is calculated in the following method.

In a period including the point in time when the torque-zero determination section 12 determines that the torque $T_r$ is zero, the variation in the speed of the rotor of the synchronous motor 2 is small. Therefore, when the speed of the rotor of the synchronous motor 2 is assumed to be a constant speed $V_0$, the rotor actual position $P_e$ at the point in time when the torque $T_r$ is zero can be expressed as Equation (11).

$$P_e = V_0 \cdot T_0 + P_0 \qquad (11)$$
$$= V_0 \cdot \frac{A_0}{A_0 - A_1} \cdot T_S + P_0$$

In the second form of the calculation process of the rotor actual position $P_e$, the magnetic pole initial position acquisition section 13 calculates the rotor actual position on the basis of Equation (11).

In a third form of the calculation process for the rotor actual position $P_e$, the rotor actual position $P_e$ is calculated in the following method.

The rotor actual position substantially monotonously increases on a proportional basis, and therefore, on the assumption that an intermediate point of the sampling period of the rotor actual position is the point in time when the torque $T_r$ is zero, the rotor actual position $P_e$ at the point in time when the torque $T_r$ is zero can be expressed as Equation (12).

$$P_e = P_0 + \frac{P_1 - P_0}{2} \qquad (12)$$
$$= \frac{P_0 + P_1}{2}$$

In the third form of the calculation process of the rotor actual position $P_e$, the magnetic pole initial position acquisition section 13 calculates the rotor actual position on the basis of Equation (12).

The magnetic pole initial position acquisition section 13 calculates the magnetic pole initial position on the basis of Equation (13) by using the rotor actual position $P_e$, at time $T_0$ when the torque $T_r$ is zero, calculated through the calculation process according to any one of the first to third forms, using the rotor actual position $P_1$ at the next sampling time $T_s$ after the torque $T_r$ has become zero, and using the number of pole pairs pp of the synchronous motor 2.

$$\theta = pp \cdot (P_1 - P_e) + \text{excitation phase} \qquad (13)$$

A magnetic pole position counter (not illustrated) is initialized at the magnetic pole initial position detected by the magnetic pole initial position detection device 1, and thereafter a value obtained by multiplying the amount of incremental pulses ($=P_n - P_{n-1}$) per sampling cycle by the number of pole pairs is added to the magnetic pole position counter.

Figure 7:
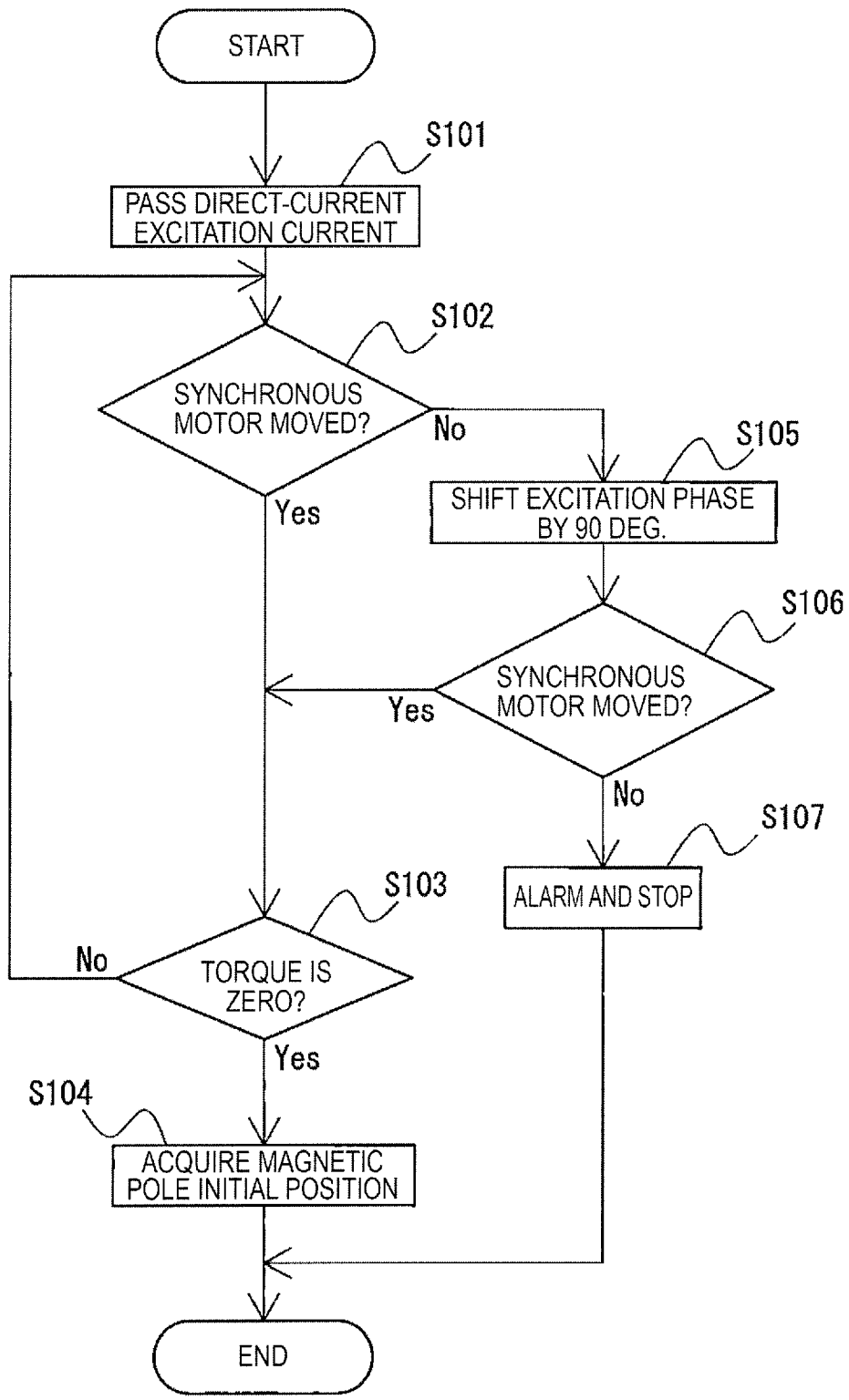
FIG. 7 is a flowchart illustrating an operation flow of the magnetic pole initial position detection device according to the first embodiment of the present disclosure.

FIG. 7 is a flow chart illustrating an operation flow of the magnetic pole initial position detection device according to the embodiment of the present disclosure.

At step S101, the direct-current excitation command generation section 11 generates a first command for causing a constant excitation current having a current phase fixed to the first phase to flow through the synchronous motor 2. The current phase (first phase) is fixed to 0 degrees, for example. The first command generated by the direct-current excitation command generation section 11 is sent to a current control section in the motor control device (not illustrated) for controlling the driving of the synchronous motor 2. The current control section in the motor control section generates a voltage command on the basis of the command received from the direct-current excitation command generation section 11 and the current feedback converted in the fixed current phase, and a power converter (not illustrated) generates a constant excitation current with a fixed current phase by applying a voltage to the synchronous motor 2 on the basis of the received voltage command.

At step S102, the magnetic pole initial position detection device 1 determines whether the rotor of the synchronous motor 2 has moved. When it is determined at step S102 that the rotor of the synchronous motor 2 has moved, the process proceeds to step S103, and when it is determined that the rotor of the synchronous motor 2 has not moved, the process proceeds to step S105.

At step S103, the torque-zero determination section 12 determines whether the torque generated in the rotor of the synchronous motor 2 is zero when a constant excitation current based on the command generated by the direct-current excitation command generation section 11 flows through the synchronous motor 2. For example, the torque-zero determination section 12 determines that the timing when the polarity of the acceleration of the synchronous motor 2 changes is the point in time when the torque is zero. Also, for example, the torque-zero determination section 12 determines that the point in time when the speed of the synchronous motor 2 is maximized or minimized is the point in time when the torque is zero. When it is determined at step S103 that the torque is zero, the process proceeds to step S104, and when it is determined that the torque is not zero, the process returns to step S102.

At step S104, the magnetic pole initial position acquisition section 13 acquires the magnetic pole initial position of the rotor of the synchronous motor 2 on the basis of the rotor actual position of the synchronous motor 2 at or near the point in time when the torque-zero determination section 12 determines that the torque is zero; the number of pole pairs of the synchronous motor 2; and the excitation phase during the direct-current excitation.

When it is determined at step S102 that the rotor of the synchronous motor 2 has not moved, the direct-current excitation command generation section 11, at step S105, generates a command for causing a constant excitation current to flow through the synchronous motor 2 in a current phase that is shifted by 90 degrees from the current phase set at step S101 (e.g., 0 degrees). The reason for again applying the constant excitation current with the current phase shifted by 90 degrees when it is determined at step S102 that the rotor of the synchronous motor 2 has not moved is to avoid a situation where, in the case where the current phase set at step S101 is already at or near the magnetic pole initial position of the rotor, the rotor of the synchronous motor 2 does not make oscillatory movement even when an excitation current flows therethrough, thus failing to accurately acquire the magnetic pole initial position.

At step S106, the magnetic pole initial position detection device 1 determines whether the rotor of the synchronous motor 2 has moved. When it is determined at step S106 that the rotor of the synchronous motor 2 has moved, the process proceeds to step S103, and when it is determined that the rotor of the synchronous motor 2 has not moved, the process proceeds to step S107.

When it is determined at step S106 that the rotor of the synchronous motor 2 has not moved, the rotor of the synchronous motor 2 may possibly be in some locked state such as being fixed by a fastener, and accordingly the magnetic pole initial position detection device 1 generates an alarm and stops the operation.

Figure 8:
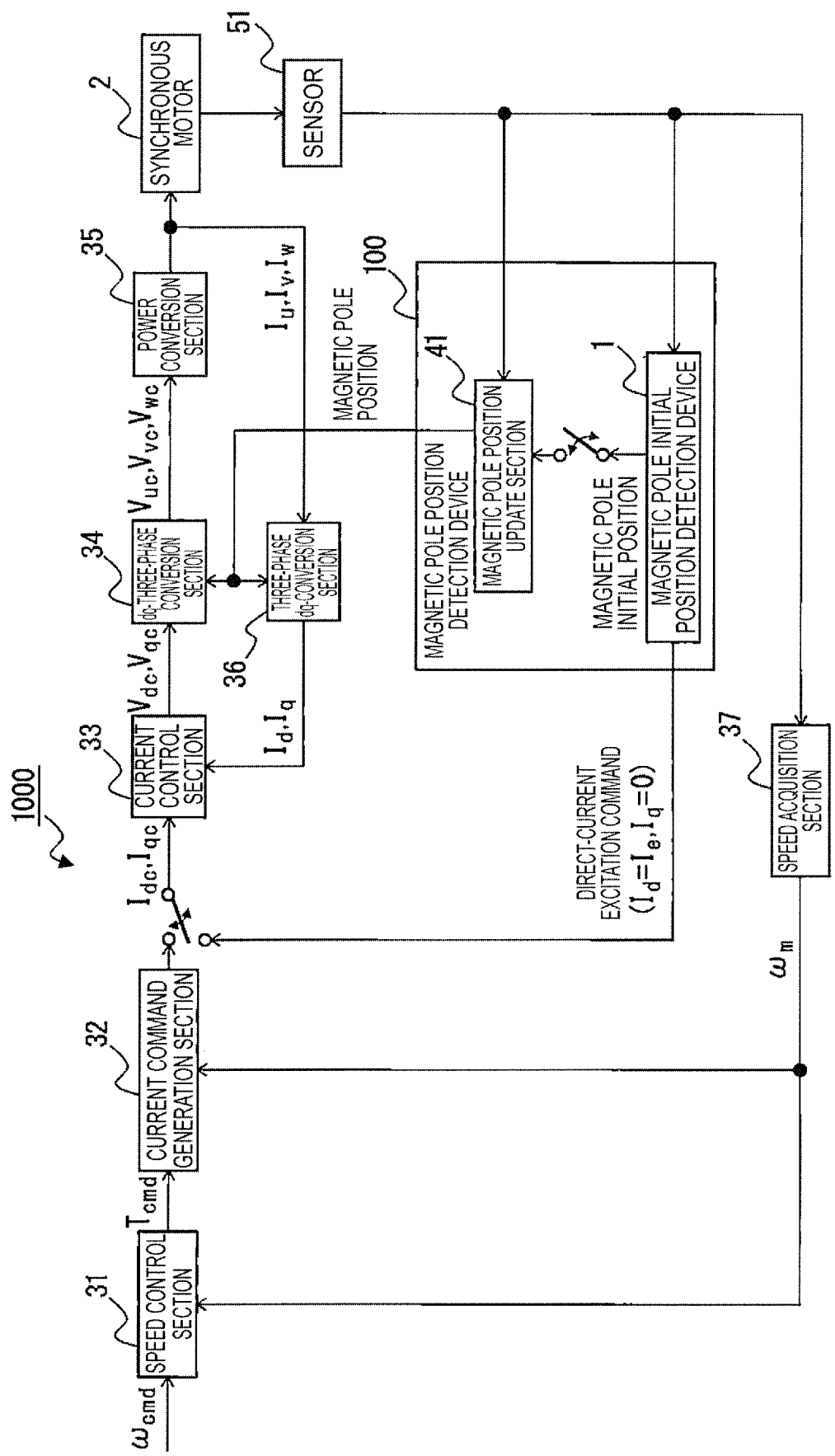
FIG. 8 is a block diagram illustrating a motor control device including a magnetic pole position detection device having the magnetic pole initial position detection device according to the first embodiment of the present disclosure.

FIG. 8 is a block diagram illustrating the motor control device 1000 including a magnetic pole position detection device 100 including the magnetic pole initial position detection device 1 according to the embodiment of the present disclosure.

The magnetic pole position detection device 100 includes the magnetic pole initial position detection device 1 and a magnetic pole position update section 41. The motor control device 1000 includes the magnetic pole position detection device 100, a speed control section 31, a current command generation section 32, the current control section 33, a dq-three-phase conversion section 34, the power conversion section 35, a three-phase dq-conversion section 36, and a speed acquisition section 37.

The speed control section 31 generates a torque command $T_{cmd}$ on the basis of a speed command $\omega_{cmd}$ and a speed $\omega_m$ of the rotor of the synchronous motor 2 acquired by the speed acquisition section 37.

The current command generation section 32 generates a d-axis current command $I_{dc}$ and a q-axis current command $I_{qc}$ on the basis of the torque command $T_{cmd}$ and the speed $\omega_m$ of the rotor of the synchronous motor 2 acquired by the speed acquisition section 37.

The three-phase dq-conversion section 36 performs three-phase dq conversion on three-phase currents $I_u$, $I_v$ and $I_w$ output from the power conversion section 35 on the basis of the magnetic pole position detected by the magnetic pole position detection device 100 and outputs a d-axis current $I_d$ and a q-axis current $I_q$ to the current control section 33.

In normal motor control, the current control section 33 generates a d-axis voltage command $V_{dc}$ and a q-axis voltage command $V_{qc}$ on the basis of the d-axis current command $I_{dc}$, the q-axis current command $I_{qc}$, the d-axis current $I_d$, and the q-axis current $I_q$. At the time of magnetic pole initial position detection, the current control section 33 generates the d-axis voltage command $V_{dc}$ and the q-axis voltage command $V_{qc}$ for applying a constant excitation current with a fixed current phase on the basis of a direct-current excitation command ($I_d = I_e$, $I_q = 0$) output from (the direct-current excitation command generation section 11 of) the magnetic pole initial position detection device 1.

The dq-three-phase conversion section 34 performs dq-three-phase conversion on the d-axis voltage command $V_{dc}$ and the q-axis voltage command $V_{qc}$ on the basis of the magnetic pole position detected by the magnetic pole position detection device 100 and outputs three-phase voltage commands $V_{uc}$, $V_{vc}$, and $V_{wc}$ to the power conversion section 35.

The power conversion section 35 is formed of, for example, a reverse converter (three-phase inverter) having a full-bridge circuit of semiconductor switching elements and outputs the three-phase currents $I_u$, $I_v$, and $I_w$ for controlling the on-off of the semiconductor switching elements to drive the synchronous motor 2 on the basis of the received three-phase voltage commands $V_{uc}$, $V_{vc}$, and $V_{wc}$.

The magnetic pole position update section 41 in the magnetic pole position detection device 100 initializes the magnetic pole position counter at a magnetic pole initial position output from (the magnetic pole initial position acquisition section 13 of) the magnetic pole initial position detection device 1. After the initialization of the magnetic pole position counter, the magnetic pole position update section 41 adds the incremental pulse amount multiplied by the number of pole pairs to the magnetic pole position counter and outputs the magnetic pole position.

The direct-current excitation command generation section 11, the torque-zero determination section 12, the magnetic pole initial position acquisition section 13, the rotor actual position acquisition section 14, the speed control section 31, the current command generation section 32, the current control section 33, the dq-three-phase conversion section 34, the three-phase dq-conversion section 36, the speed acquisition section 37, and the magnetic pole position update section 41 may be configured as a software program or may be configured as a combination of various electronic circuits and software programs, for example. For example, in the case where the above-mentioned sections are configured as a software program, the functions of the sections can be achieved by operating an arithmetic processing device in the motor control device 1000 in accordance with the software program. Alternatively, the direct-current excitation command generation section 11, the torque-zero determination section 12, the magnetic pole initial position acquisition section 13, the rotor actual position acquisition section 14, the speed control section 31, the current command generation section 32, the current control section 33, the dq-three-phase conversion section 34, the three-phase dq-conversion section 36, speed acquisition section 37, and magnetic pole position update section 41 may be achieved as a semiconductor integrated circuit having a written software program that achieves the functions of the sections.

Second Embodiment

Figure 9:
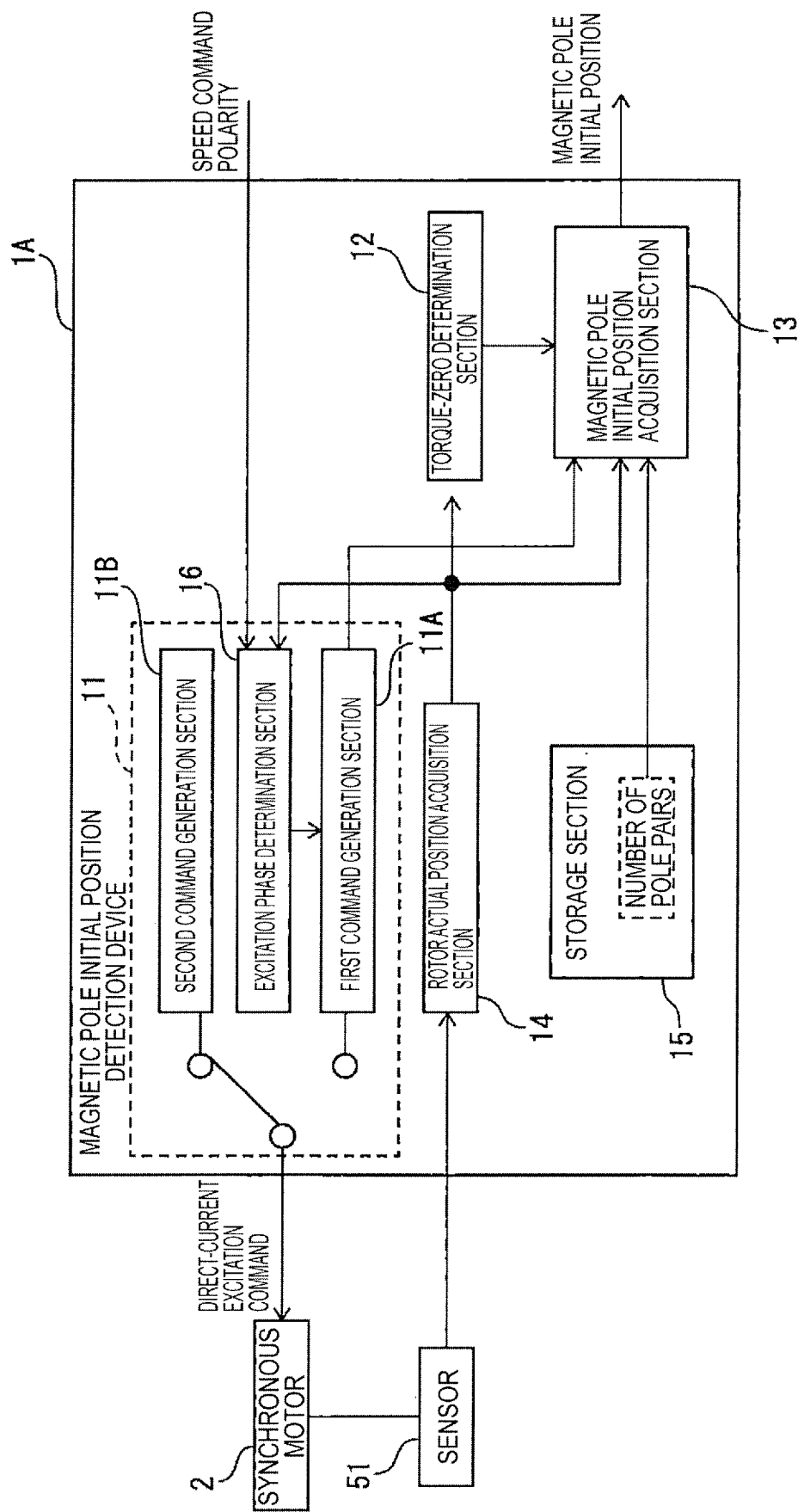
FIG. 9 is a block diagram illustrating a configuration of a magnetic pole initial position detection device according to a second embodiment of the present disclosure.

A magnetic pole initial position detection device 1A according to a second embodiment of the present disclosure is described below. The magnetic pole initial position detection device 1A corresponds to a modified example of the magnetic pole initial position detection device 1 according to the first embodiment. FIG. 9 is a block diagram illustrating a configuration of the magnetic pole initial position detection device 1A. The magnetic pole initial position detection device 1A includes a first command generation section 11A, an excitation phase determination section 16, and a second command generation section 11B as components for achieving the function of the direct-current excitation command generation section 11 according to the first embodiment. The first command generation section 11A has a function of generating the first command for causing a constant excitation current having a current phase fixed to the first phase to flow through the synchronous motor 2, which is described in the first embodiment as the function of the direct-current excitation command generation section 11. The second command generation section 11B generates a command (hereinafter also referred to as a second command) for causing a constant excitation current with a current phase fixed to an arbitrarily set second phase to flow through the synchronous motor 2. The excitation phase determination section 16 determines the first phase for generating the first command such that the synchronous motor 2 rotates under the first command in a direction identical to the rotational direction of the speed command ($\omega_{cmd}$) on the basis of the rotational direction of the synchronous motor 2 when the excitation current based on the second command flows through the synchronous motor 2, and the rotational direction of the speed command ($\omega_{cmd}$) to the synchronous motor 2. With this configuration, the direction in which the rotor rotates in accordance with the direct-current excitation under the first command generated by the first command generation section 11A can be matched to the rotational direction of the rotor under the speed command ($\omega_{cmd}$), by which it is possible to smoothly perform the transition from the magnetic pole initial position detection operation to the speed control and to shorten the time required to reach the command speed. The following description will be made by focusing attention on the above-mentioned functions of the magnetic pole initial position detection device 1A according to the second embodiment.

An overview of the detection operation of the magnetic pole initial position by the magnetic pole initial position detection device 1A according to the second embodiment is as follows. First, the second command generation section 11B performs direct-current excitation on the synchronous motor 2 in a current phase of an arbitrarily set second phase ($\theta_0$). In this case, the direct-current excitation may be extremely short. As a result, the rotor starts to rotate from the initial position in a direction corresponding to the direct-current excitation in the current phase of the second phase. Next, the excitation phase determination section 16 acquires the relationship between the rotational direction of the rotor and the excitation phase (second phase) at this time. On the basis of this relationship, the excitation phase determination section 16 determines the first phase for generating the first command such that the direction (polarity) in which the rotor rotates under the first command matches the rotational direction (polarity) of the speed command ($\omega_{cmd}$). The first command generation section 11A generates the first command by using the excitation phase (first phase) determined by the excitation phase determination section 16. When the direct-current excitation is performed under the first command generated by the first command generation section 11A, a magnetic pole initial value is acquired through an operation of the torque-zero determination section 12 and the magnetic pole initial position acquisition section 13. In this case, the torque-zero determination section 12 detects a torque-zero that is generated first after the first command to the synchronous motor 2 by the first command generation section 11A is started and notifies the magnetic pole initial position acquisition section 13 of the detection result. When the magnetic pole initial position is acquired, transition to the speed control of the synchronous motor 2 under the speed command ($\omega_{cmd}$) is performed.

Figure 10:
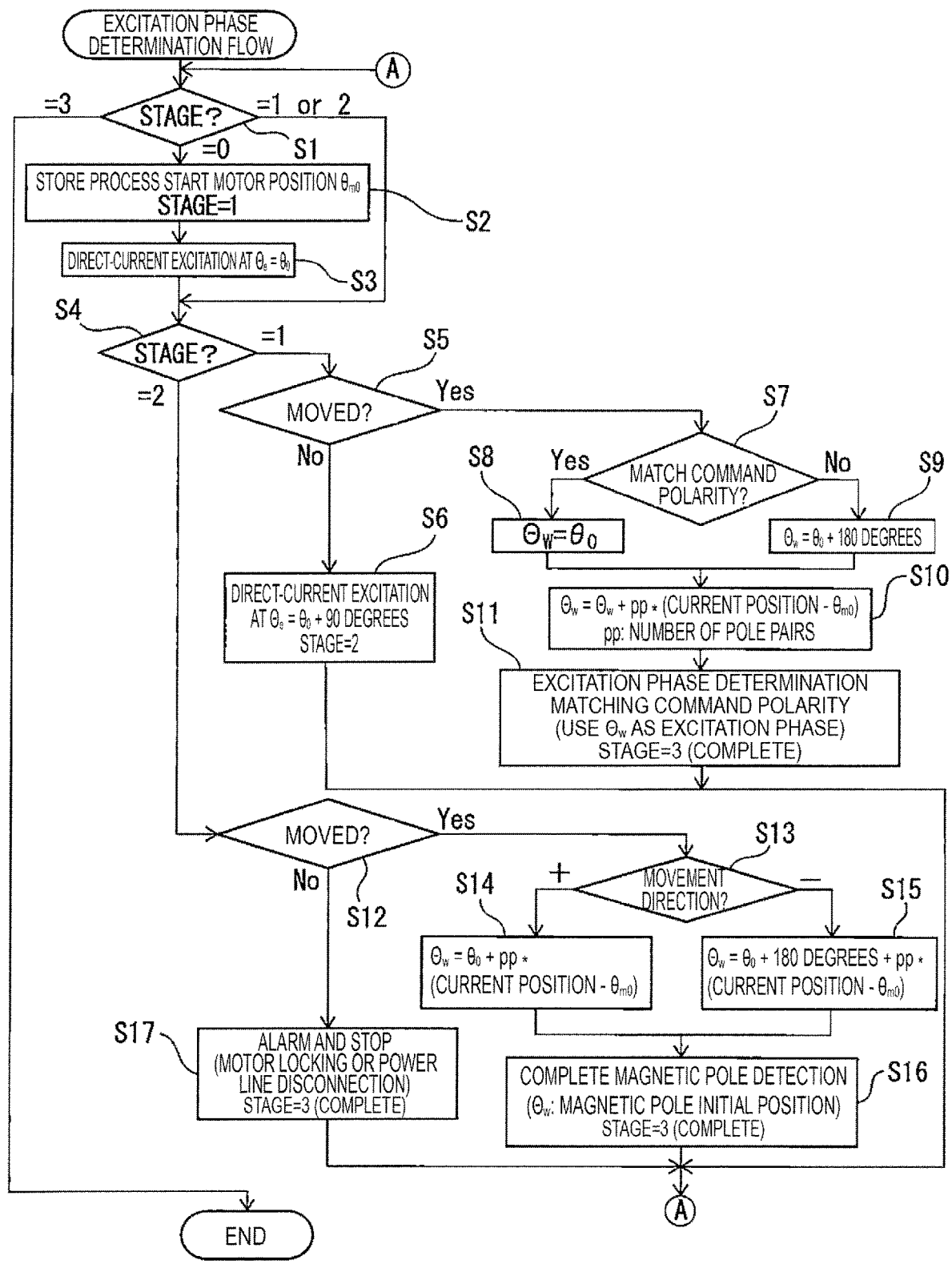
FIG. 10 is a flowchart illustrating an excitation phase determination process for determining an excitation phase for use in magnetic pole initial position detection.

FIG. 10 is a flowchart illustrating a process (hereinafter referred to as an excitation phase determination process) for determining an excitation phase (first phase) used for the magnetic pole initial position detection executed by the magnetic pole initial position detection device 1A (mainly the second command generation section 11B and the excitation phase determination section 16). First, the magnetic pole initial position detection device 1A confirms the value of a variable 'STAGE' (step S1). Since the value of the variable 'STAGE' is initialized to zero at the start of the process, the value is determined as 'STAGE'=0 when step S1 is performed for the first time, and the process proceeds to step S2. At step S2, the magnetic pole initial position detection device 1A acquires and stores a rotor position ($\theta_{m0}$) at the start of this process from the rotor actual position acquisition section 14 and updates the variable 'STAGE' to 1.

Next, the second command generation section 11B generates the second command by substituting a value of an arbitrarily set current phase $\theta_0$ (second phase) into a variable $\Theta_e$ for setting the current phase of the direct-current excitation. The second command is sent to the current control section 33 of the motor control device 1000, and direct-current excitation under the second command is performed (step S3). At step S4, the value of the variable 'STAGE' is confirmed. Currently, the value is 'STAGE'=1, and accordingly the process proceeds to step S5. At step S5, the magnetic pole initial position detection device 1A determines whether the rotor has moved. As a result, when the rotor has moved (S5: YES), the excitation phase determination section 16 determines whether the direction (polarity) in which the rotor moves matches the rotational direction (polarity) of the speed command ($\omega_{cmd}$) (step S7). As a result, when the direction in which the rotor has moved and the rotational direction of the speed command match, the excitation phase determination section 16 substitutes the value of the current phase $\theta_0$ set at step S3 into a variable $\Theta_w$ into which the excitation phase for generating the first command is substituted (step S8).

On the other hand, when the direction in which the rotor has moved and the rotational direction of the speed command ($\omega_{cmd}$) do not match (S7: NO), the excitation phase determination section 16 substitutes, into the variable $\Theta_w$, the value obtained by adding 180 degrees to the current phase $\theta_0$ (step S9). Here, the reason that the value obtained by adding 180 degrees to the current phase $\theta_0$ is substituted into the variable $\Theta_w$ is to set the rotational direction of the rotor in the direct-current excitation in the excitation phase ($\Theta_w$) to the direction opposite to the rotational direction of the rotor in the case of the direct-current excitation in the current phase $\theta_0$. The current position of the rotor is advanced from the rotor position ($\theta_{m0}$) at the start of the process that is stored at step S2, and accordingly the excitation phase (first phase) for generating the final first command is set by adding the phase corresponding to the advancement of the rotor to the variable $\Theta_w$ (step S10). Specifically, at step S10, the variable $\Theta_w$ is determined as follows:

$$\Theta_w = \Theta_w + pp(P_c - \theta_{m0})$$

where

Pc: rotor current position pp: number of pole pairs.

When the excitation phase ($\Theta_w$) for generating the first command is determined in this method, the excitation phase determination section 16 forwards the determined excitation phase ($\Theta_w$) to the first command generation section 11A and updates the variable 'STAGE' to 3, which indicates completion of the process (step S11). When the variable 'STAGE' is updated to 3 at step S11, it is determined at step S1 that the variable 'STAGE' is 3, and this excitation phase determination process is terminated. By using the excitation phase ($\Theta_w$) determined as described above to generate the first command in the first command generation section 11A, the rotational direction of the rotor in the direct-current excitation for the initial magnetic pole detection operation can be matched to the rotational direction of the rotor under the speed command ($\omega_{cmd}$).

When it is determined at step S5 that the rotor does not move, the magnetic pole initial position detection device 1A performs direct-current excitation in a current phase $\Theta_e$ obtained by adding 90 degrees to the current phase $\theta_0$ (step S6). Here, the case where it is determined at step 5 that the rotor does not move corresponds to the case where the current phase $\theta_0$ is at or near the magnetic pole initial position (phase) of the rotor. Accordingly, in order to avoid this, direct-current excitation is performed with the current phase $\Theta_e$ obtained by adding 90 degrees to the current phase $\theta_0$. At step S6, the variable 'STAGE' is updated to 2. When the variable 'STAGE' is updated to 2 at step S6 and the process returns to step S1, it is determined that the variable 'STAGE' is 2, and the process proceeds to step S4. In this case, it is determined at step S4 that the value of the variable 'STAGE' is 2 and the process proceeds to step S12.

At step S12, it is determined whether the rotor has moved as a result of the direct-current excitation with the current phase $\Theta_e$ obtained by adding 90 degrees to the current phase $\theta_0$ at step S6. As a result, when it is determined that the rotor has moved (S12: YES), the direction (polarity) in which the rotor has rotated is determined (step S13). As a result, when it is determined that the rotational direction of the rotor is positive direction (S13: '+'), the current phase $\theta_0$ set at step S3 represents the magnetic pole initial position (phase). In this case, a value ($\Theta_w$) obtained by adding, to the current phase $\theta_0$, the phase corresponding to the movement of the rotor after the start of this process is determined using the following equation, and the determined value is set to the magnetic pole initial position (step S14).

$$\Theta_w = \theta_0 + pp(P_c - v_{m0})$$

On the other hand, when it is determined at step S13 that the rotational direction of the rotor is a negative direction (S13: '−'), a value obtained by adding 180 degrees to the current phase $\theta_0$ set at step S3 represents a magnetic pole initial position (phase). In this case, a value ($\Theta_w$) obtained by adding, to the value obtained by adding 180 degrees to the current phase $\theta_0$, the phase corresponding to the movement of the rotor after the start of this process is determined using the following equation, and the determined value is set to the magnetic pole initial position (step S15).

$$\Theta_w = \theta_0 + 180 \text{ degrees} + pp(P_c - \theta_{m0})$$

At step S16, $\Theta_w$ obtained at step S14 or S15 is determined to be the magnetic pole initial position, and the variable 'STAGE' is updated to 3 to complete this excitation phase determination process. In this case, the excitation phase determination process is terminated, generation of the first command by the first command generation section 11A is not performed, and the detection of the magnetic pole initial position based on the first command is not performed. The $\theta_w$ determined at step S14 or S15 is set as a magnetic pole initial position that is output from the magnetic pole initial position detection device 1 to the magnetic pole position update section 41.

Figure 11:
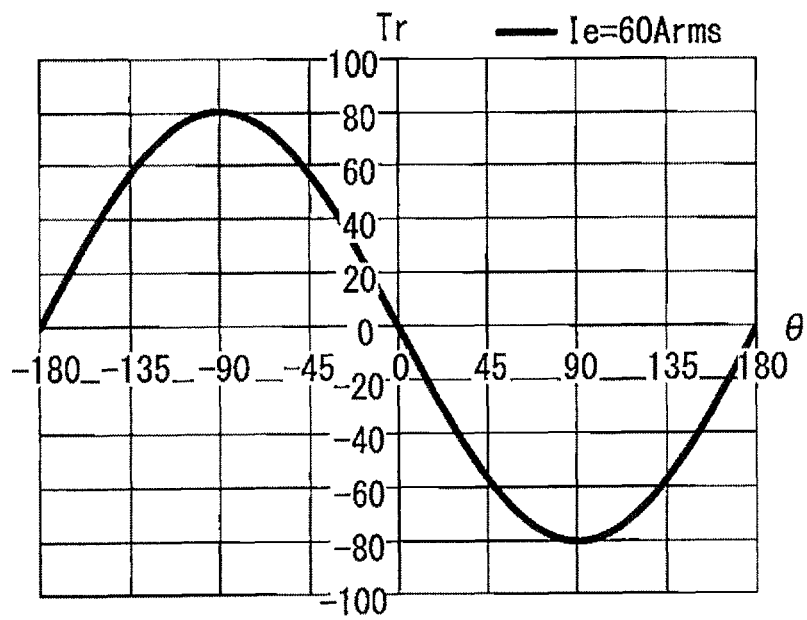
FIG. 11 is a graph illustrating a relationship between a phase of an excitation current and a torque in the case of a non-salient-pole synchronous motor.

Here, the following describes the capability of determining the magnetic pole initial position as in steps S14 and S15 in accordance with the rotational direction of the rotor in the case where the direct-current excitation is performed in the current phase $\Theta_e$ obtained by adding 90 degrees to the current phase $\theta_0$ at step S6. It is determined at step S5 that the rotor does not move when the current phase $\theta_0$ matches the phase of the magnetic pole initial value or when the current phase $\theta_0$ is different from the phase of the magnetic pole initial position by 180 degrees. Now a situation is considered in which the rotor has moved with direct-current excitation in a current phase of $\theta_0$+90 degrees at step S6. As described with reference to FIG. 3, the rotor moves when there is a deviation θ between the excitation phase of the excitation current $I_e$ (in FIG. 3, 0 degrees) and the magnetic pole position, i.e., when the torque expressed in Equation (2) and Equation (3) is generated. Here, a case of no salient pole (Equation (3)) is considered. FIG. 11 is a graph illustrating a torque generated in accordance with Equation (3) by the deviation θ between the excitation phase and the magnetic pole position. As illustrated in FIG. 11, the torque has a negative value when the deviation θ between the excitation phase and the magnetic pole position is in a positive range (0 to 180 degrees), and the torque has a positive value when the θ is in a negative range (0 to −180 degrees).

Figure 12:
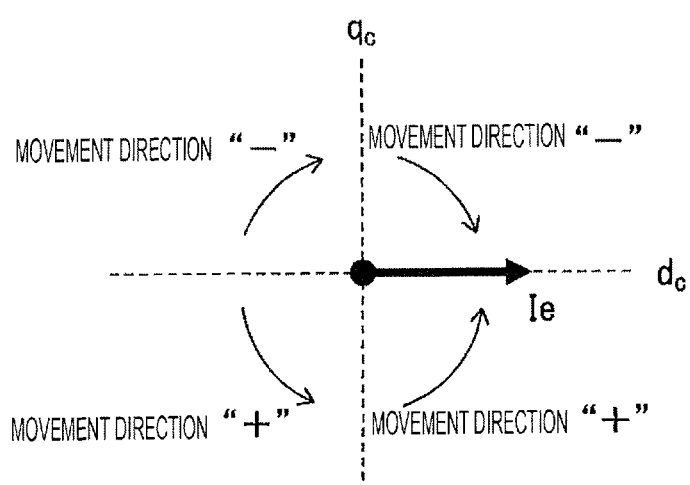
FIG. 12 is a diagram for illustrating a relationship between a phase of an excitation current and a rotational direction of a rotor.

In this case, as illustrated in FIG. 12, the rotor rotates in the negative direction when the magnetic pole position (phase) is in the first quadrant and the second quadrant with respect to a coordinate system in which the excitation current $I_e$ is set to a phase of 0 degrees of the axis $d_c$, and the rotor rotates in the positive direction when the magnetic pole position (phase) is in the third quadrant and the fourth quadrant with respect to the coordinate system. Here, considering that the positive direction of the phase is counterclockwise in FIG. 12, it can be understood that the rotational direction of the rotor in the direct-current excitation in the current phase ($\theta_0$+90 degrees) is determined to be positive (S13: '+') when the magnetic pole initial position is located at a position shifted by 90 degrees in the negative direction (i.e., the position of the current phase $\theta_0$) with respect to the current phase ($\theta_0$+90 degrees). On the other hand, the rotational direction of the rotor in the direct-current excitation in the current phase ($\theta_0$+90 degrees) is determined to be negative (S13: '−') when the magnetic pole initial position is located at a position shifted by 90 degrees in the positive direction (i.e., a position obtained by adding 180 degrees to the current phase $\theta_0$) with respect to the current phase ($\theta_0$+90 degrees). Accordingly, at step S14, the value ($\Theta_w$) obtained by adding the phase corresponding to the movement of the rotor to the current phase $\theta_0$ can be determined as the magnetic pole initial value, and at step S15, the value ($\Theta_w$) obtained by adding the phase corresponding to the movement of the rotor to the value obtained by adding 180 degrees to the current phase $\theta_0$ can be determined as the magnetic pole initial value.

Returning to the description of FIG. 10, it is determined that the rotor does not move at step S12 when the synchronous motor 2 is in a locked state or when the power line is in a disconnected state. Accordingly, in this case, the magnetic pole initial position detection device 1A generates an alarm and updates the variable 'STAGE' to 3 in order to stop the process.

As described above, according to the second embodiment, the direction in which the rotor rotated by the direct-current excitation under the first command generated by the first command generation section 11A can be matched to the rotational direction of the rotor under the speed command ($\omega_{cmd}$), and the transition from the magnetic pole initial position detection operation to the speed control can be performed smoothly.

According to the embodiments of the present disclosure, it is possible to achieve a magnetic pole initial position detection device using the direct-current excitation method that is capable of acquiring a magnetic pole initial position of a rotor of a synchronous motor in a short time, and it is also possible to achieve a magnetic pole position detection device provided with the magnetic pole initial position detection device.

While the invention has been described with reference to specific embodiments, it will be understood, by those skilled in the art, that various changes or modifications may be made thereto without departing from the scope of the claims described later.

The invention claimed is:

1. A magnetic pole initial position detection device configured to detect a magnetic pole initial position of a rotor of a synchronous motor, the magnetic pole initial position detection device comprising:
a direct-current excitation command generation section configured to generate a first command for causing a constant excitation current with a current phase fixed to a first phase to flow through the synchronous motor;
a torque-zero determination section configured to acquire at least one of an acceleration or a speed of the rotor of the synchronous motor and determine when a torque generated in the rotor of the synchronous motor is zero when the excitation current based on the first command flows through the synchronous motor, wherein the torque-zero determination section determines that the torque is zero at a point in time when a polarity of an acceleration of the synchronous motor changes; and
a magnetic pole initial position acquisition section configured to acquire the magnetic pole initial position of the rotor of the synchronous motor on a basis of a rotor actual position at or near a point in time when the torque-zero determination section determines that the torque is zero; a number of pole pairs of the synchronous motor; and an excitation phase during direct-current excitation under the first command,
wherein the rotor actual position at or near the point in time when the determined torque is zero is a position of the rotor at any point in time between two sampling points in time that define a sampling period including the point in time when the torque-zero determination section determines that the torque is zero of the sampling periods of the position of the rotor acquired by a rotor actual position acquisition section.

2. A magnetic pole initial position detection device configured to detect a magnetic pole initial position of a rotor of a synchronous motor, the magnetic pole initial position detection device comprising:
a direct-current excitation command generation section configured to generate a first command for causing a constant excitation current with a current phase fixed to a first phase to flow through the synchronous motor;
a torque-zero determination section configured to acquire at least one of an acceleration or a speed of the rotor of the synchronous motor and determine when a torque generated in the rotor of the synchronous motor is zero when the excitation current based on the first command flows through the synchronous motor; and
a magnetic pole initial position acquisition section configured to acquire the magnetic pole initial position of the rotor of the synchronous motor on a basis of a rotor actual position at or near a point in time when the torque-zero determination section determines that the torque is zero; a number of pole pairs of the synchronous motor; and an excitation phase during direct-current excitation under the first command,
wherein the rotor actual position at or near the point in time when the determined torque is zero is a position of the rotor at any point in time between two sampling points in time that define a sampling period including the point in time when the torque-zero determination section determines that the torque is zero of the sampling periods of the position of the rotor acquired by a rotor actual position acquisition section,
wherein the torque-zero determination section determines that the torque is zero at a point in time when a speed of the synchronous motor is maximized or minimized.

3. The magnetic pole initial position detection device according to claim 1, further comprising:
a rotor actual position acquisition section configured to acquire a position of the rotor from a sensor provided in the synchronous motor; and
a storage section configured to store information relating to the number of pole pairs of the synchronous motor.

4. The magnetic pole initial position detection device according to claim 1, wherein when the synchronous motor is a salient-pole synchronous motor, the direct-current excitation command generation section generates, as the first command, a command for causing the excitation current lower than a predetermined upper limit value to flow through the synchronous motor.

5. The magnetic pole initial position detection device according to claim 4, wherein the predetermined upper limit value is determined in accordance with $$I_e < \frac{\Phi}{L_q - L_d}$$

where a magnitude of a main magnetic flux of the synchronous motor is denoted by $\Phi$, a d-phase inductance is denoted by $L_d$, and a q-phase inductance is denoted by $L_q$.

6. The magnetic pole initial position detection device according to claim 1, wherein the direct-current excitation command generation section includes:
a second command generation section configured to generate a second command for causing a constant excitation current with a current phase fixed to a second phase that is arbitrarily set, to flow through the synchronous motor;
an excitation phase determination section configured to determine the first phase for generating the first command on a basis of a rotational direction of the synchronous motor when the excitation current based on the second command is caused to flow through the synchronous motor, and a rotational direction of a speed command to the synchronous motor such that, under the first command, the synchronous motor rotates in a direction identical to the rotational direction of the speed command; and
a first command generation section configured to generate the first command by using the current phase of the first phase determined by the excitation phase determination section.

7. A magnetic pole position detection device comprising a magnetic pole position update section configured to output a magnetic pole position of the rotor of the synchronous motor that is initialized at the magnetic pole initial position detected by the magnetic pole initial position detection device according to claim 1.

\* \* \* \* \*